(12) United States Patent
Martinez et al.

(10) Patent No.: US 10,924,471 B2
(45) Date of Patent: Feb. 16, 2021

(54) METHOD FOR ENABLING AND/OR REQUESTING ACCESS BY A FIRST NETWORK SUBSCRIBER TO A SECOND NETWORK SUBSCRIBER IN A NETWORK

(71) Applicant: Robert Bosch GmbH, Stuttgart (DE)

(72) Inventors: Cyntia Vargas Martinez, Lohr am Main (DE); Julien Rausch, Gemuenden (DE); Michael Langfinger, Aschaffenburg (DE)

(73) Assignee: Robert Bosch GmbH, Stuttgart (DE)

( * ) Notice: Subject to any disclaimer, the term of this patent is extended or adjusted under 35 U.S.C. 154(b) by 192 days.

(21) Appl. No.: 16/056,989

(22) Filed: Aug. 7, 2018

(65) Prior Publication Data

US 2019/0068583 A1   Feb. 28, 2019

(30) Foreign Application Priority Data

Aug. 30, 2017   (DE) .......................... 10 2017 215 094

(51) Int. Cl.
*H04L 29/06* (2006.01)
*H04W 12/06* (2021.01)
*H04W 12/00* (2021.01)

(52) U.S. Cl.
CPC ...... *H04L 63/0823* (2013.01); *H04L 63/0884* (2013.01); *H04L 63/105* (2013.01); *H04W 12/0609* (2019.01); *H04L 2463/121* (2013.01); *H04W 12/00506* (2019.01)

(58) Field of Classification Search
CPC ............... H04L 63/0823; H04L 63/105; H04L 63/0884; H04L 2463/121; H04W 12/0609; H04W 12/00506
See application file for complete search history.

(56) References Cited

U.S. PATENT DOCUMENTS

| | | | |
|---|---|---|---|
| 5,974,146 A * | 10/1999 | Randle .................. | G06Q 20/04 705/40 |
| 7,920,587 B2 * | 4/2011 | Fuehrer ..................... | G06F 1/14 370/338 |
| 9,560,524 B1 * | 1/2017 | Reeves ................. | H04W 12/08 |
| 9,986,004 B1 * | 5/2018 | Carruth ............... | H04L 65/4084 |
| 10,652,021 B2 * | 5/2020 | Barry .................... | H04L 9/0838 |
| 2003/0196107 A1 * | 10/2003 | Robertson ........... | H04L 63/0815 726/7 |

(Continued)

*Primary Examiner* — Mahfuzur Rahman
(74) *Attorney, Agent, or Firm* — Maginot, Moore & Beck LLP (57) ABSTRACT

A method for enabling access by a first network subscriber to a second network subscriber in a network includes receiving a communication request from the first network subscriber and determining whether the second network subscriber has carried out an authentication of the first network subscriber during a first phase. The second network subscriber allows communication with the first network subscriber when the second network subscriber has carried out authentication of the first network subscriber during the first phase. The second network subscriber receives an access request from the first network subscriber and determines a level of trustworthiness of the first network subscriber. The second network subscriber enables access of the first network subscriber based on the determination of the level of trustworthiness of the first network subscriber.

15 Claims, 3 Drawing Sheets

(56) References Cited

U.S. PATENT DOCUMENTS

| | | | | |
|---|---|---|---|---|
| 2006/0204051 | A1* | 9/2006 | Holland, IV | G06Q 40/04 |
| | | | | 382/115 |
| 2008/0198868 | A1* | 8/2008 | Fuehrer | G06F 1/14 |
| | | | | 370/442 |
| 2013/0073473 | A1* | 3/2013 | Heath | G06Q 30/06 |
| | | | | 705/319 |
| 2014/0298431 | A1* | 10/2014 | Kim | H04L 63/0853 |
| | | | | 726/5 |
| 2014/0344913 | A1* | 11/2014 | Stahl | H04L 65/1006 |
| | | | | 726/11 |
| 2018/0131681 | A1* | 5/2018 | Husser | H04L 63/083 |

* cited by examiner

METHOD FOR ENABLING AND/OR REQUESTING ACCESS BY A FIRST NETWORK SUBSCRIBER TO A SECOND NETWORK SUBSCRIBER IN A NETWORK

This application claims priority under 35 U.S.C. § 119 to patent application no. DE 102017215094.7 filed on Aug. 30, 2017 in Germany, the disclosure of which is incorporated herein by reference in its entirety.

The disclosure relates to a method for enabling and/or requesting access by a first network subscriber to a second network subscriber in a network, and a computing unit and a computer program for carrying it out.

BACKGROUND

In order for a network subscriber in a network to be able to access services provided by other network subscribers, a complex configuration process is usually necessary. Network subscribers generally require information about the network and the other network subscribers for configuring their own provided services. Such configuration processes may be carried out manually or in a (partially) automated manner.

The goal of the plug-and-play concept is to reduce the amount of manual effort in such configuration processes. The underlying main idea is that network subscribers in a network identify one other and exchange information which is used for configuration or for communicating capabilities. Implementations of the plug-and-play concept include, for example, Universal Plug and Play (UPnP), Link Layer Discovery Protocol (LLDP), OPC Unified Architecture (OPC UA), and Devices Profile for Web Services (DPWS).

SUMMARY

According to the disclosure, a method for enabling and/or requesting access by a first network subscriber to a second network subscriber in a network, and a computing unit and a computer program carrying it out, are provided. Advantageous embodiments constitute the subject matter as disclosed.

Within the scope of the disclosure, a means is provided for carrying out an automated mutual authentication and authorization of network subscribers in a simple and low-effort manner, in order, on the basis thereof, to enable access by a first network subscriber to a second network subscriber.

During a first phase, the device identification and authentication take place. In this context, this first phase is therefore in particular also referred to as the authentication phase or device identification phase. For this purpose, the first network subscriber transmits an identification message to the second network subscriber. After receiving this identification message, the second network subscriber carries out an authentication of the first network subscriber as a function of the identification message, i.e., the first network subscriber has proven its identity to the second network subscriber.

In particular, this identification message contains information about the first network subscriber, in particular about which services the first network subscriber provides. After authentication has been successfully carried out, in particular the identity of the first network subscriber and the services provided by said subscriber are known to the second network subscriber. Advantageously, the second network subscriber has registered the first network subscriber as a subscriber in the network for itself.

Advantageously, the first network subscriber transmits the identification message as a broadcast to all additional network subscribers in the network. In particular, after receiving this broadcast, all other network subscribers respectively carry out an authentication of the first network subscriber.

After this first phase, the first network subscriber is in particular authenticated, but is advantageously not yet authorized; i.e., the first network subscriber does not yet have any authorizations to access the second network subscriber. Such authorizations are in particular granted during a second phase.

During the second phase, a request is made for access by the first network subscriber to the second network subscriber. In this context, this second phase is referred to as an authorization phase or a security configuration phase.

During this second phase, the first network subscriber transmits a communication request to the second network subscriber. By means of this communication request, the first network subscriber informs the second network subscriber that said first network subscriber would like to communicate with said second network subscriber, in particular in an encrypted and secure manner, in particular in order to access a service provided by the second network subscriber.

After receiving this communication request, the second network subscriber checks whether it has carried out an authentication of the first network subscriber during the first phase. If this is the case, the second network subscriber allows communication with the first network subscriber. The second network subscriber thus communicates in particular with the first network subscriber only if said second network subscriber successfully authenticated said first network subscriber during the first phase, i.e., advantageously, only if the first network subscriber is known to the second network subscriber. If the second network subscriber did not carry out an authentication of the first network subscriber during the first phase, it advantageously does not allow any communication with the first network subscriber.

The first network subscriber transmits an access request to the second network subscriber, in particular after said second network subscriber has allowed communication with the first network subscriber. In particular, via this access request, the first network subscriber informs the second network subscriber about the service provided by the second network subscriber which it would like to access.

After receiving this access request, the second network subscriber checks a level of trustworthiness of the first network subscriber. As a function of this check, the second network subscriber allows access by the first network subscriber, or rejects access.

Thus, if an access attempt by the first network subscriber has been received, the second network subscriber advantageously checks "on demand" whether this authenticated, already-known first network subscriber is also authorized to carry out the respective access. Advantageously, if an access attempt has been received, a corresponding security configuration is thus carried out in order to ensure secure access by the first network subscriber to the second network subscriber.

The disclosure in particular provides a means of securely adding new network subscribers to the network in a simple manner, and enabling secure communication by the new subscriber with the other network subscribers. Thus, in particular an uncomplicated, low-effort exchange of network subscribers in the network is also made possible. Within the scope of the method, new network subscribers may be automatically detected during normal operation, and in particular during the normal operation of the network, network subscribers may be automatically configured for communicating with one another, or rather, for accessing one another. Thus, within the scope of the method, automatic device identification and automated security configuration are carried out.

A complex configuration process is generally required in order to add new network subscribers to a network in a conventional manner. Here, a basic configuration of the new network subscriber is initially carried out, during which, for example, configuration of a network address or the functionality and services provided by the new network subscriber takes place. After this basic configuration, a configuration of log-in information generally takes place, so that the new network subscriber can access services of the other network subscribers, and vice-versa. In this case, on the one hand, log-in information is configured, via which the new network subscriber can communicate with the other network subscribers and can use services of the other network subscribers. On the other hand, corresponding log-in information is configured for each of the other network subscribers, so that they can respectively communicate with the new network subscriber and can use its services. These configurations are generally carried out manually by a user or by a central instance, for example, by a central server. During this configuration of log-in information, generally, predefined hard-coded access data are typically used, which are typically transmitted manually or by the central server to the individual network subscribers, where they are stored.

The initial configuration process is then completed, and the new network subscriber may be used in the network.

Such a complex configuration process is not necessary within the scope of the disclosure. Instead, during the first phase, a mutual authentication of all network subscribers is advantageously carried out automatically during the normal operation of the network. In particular, during the first phase, all network subscribers advantageously exchange their identities.

Within the scope of the method, it is in particular not necessary to carry out a manual or central configuration of log-in information. Furthermore, in particular no predefined hard-coded access data are used. Instead, during the second phase, advantageously, access data and log-in information for communication between two network subscribers is automatically created, if a corresponding attempt is made by one of these two network subscribers to access the other one. Log-in information is thus in particular created "on demand" during an access attempt and is used for the respective access. Advantageously, if there is an access attempt, the trustworthiness of the network subscriber may thus be automatically checked. In particular, the trustworthiness of the network subscriber may be evaluated in an automated manner over its entire lifetime.

Within the scope of the method, the first network subscriber in particular assumes the role of a client, and the second network subscriber assumes the role of a server. Advantageously, all network subscribers in the network are configured to carry out both roles, i.e., both the role of a client and that of the server, depending on whether said network subscriber would like to access another network subscriber, or whether another network subscriber accesses said network subscriber. The first and the second network subscriber may advantageously thus respectively be any subscribers to the network.

Advantageously, in the first phase, the first network subscriber transmits the identification message to the second network subscriber at predefined intervals. The first phase is thus advantageously carried out continuously, or rather, repeated cyclically. Advantageously, in each case, after receiving the identification message in the first phase, the second network subscriber checks whether it has already carried out an authentication of the first network subscriber. If this is not the case, it carries out the authentication.

Preferably, the authentication of the first network subscriber is valid until the expiration of a predefined validity interval. If the first network subscriber, for example, is removed from the network, or if a defect occurs with the first network subscriber, its authentication in particular expires automatically without requiring additional action. By means of the cyclical transmission of the identification message in each case after the predefined time interval, the authentication of the first network subscriber is renewed in each case, and the validity interval is respectively restarted. Advantageously, the predefined time interval is shorter than the predefined validity interval.

Advantageously, in the second phase, after receiving the communication request, the second network subscriber checks whether it has carried out an authentication of the first network subscriber during the first phase, and if it has, it checks whether this authentication is still valid. Only if this is the case does it allow the communication with the first network subscriber.

Preferably, in the first phase, during the authentication, the second network subscriber creates an entry for the first network subscriber in a database. This database is in particular stored internally in the second network subscriber, and can advantageously be viewed and changed by said second network subscriber. In particular, the identity and/or the identity message of the first network subscriber and/or services provided by the first network subscriber may be stored as such an entry. The database comprises in particular a corresponding entry for each network subscriber which are known to the second network subscriber. Advantageously, each of the network subscribers has such a database.

In the second phase, after receiving the communication request, the second network subscriber preferably checks whether the corresponding entry for the first network subscriber is present in the database, in order to check whether said second network subscriber carried out an authentication of the first network subscriber during the first phase. Said second network subscriber allows communication with the first network subscriber only if the corresponding entry is present.

Advantageously, the entry created for the first network subscriber is removed from the database after the expiration of the predefined validity interval. Advantageously, for this purpose, the entry may be provided with a time stamp. In the case of renewed authentication of the first network subscriber, the time stamp is in particular updated, and the validity interval is restarted. Advantageously, the corresponding entry is thus automatically deleted if the first network subscriber is removed from the network.

Preferably, in the first phase, during the authentication, the second network subscriber requests a certificate of the first network subscriber. After receiving this certificate, the second network subscriber preferably carries out the authentication of the first network subscriber as a function of the certificate. In particular, the certificate may be stored as a corresponding entry in the database.

Advantageously, during the first phase, each of the network subscribers transmits an identification message to the other network subscribers, in particular in the form of a broadcast in each case. When an identification message is received, the other network subscribers advantageously respectively carry out an authentication of the corresponding subscriber which transmitted the corresponding identification message. Advantageously, during the first phase, all network subscribers carry out a mutual authentication in an automated manner. In particular, it may thus be made possible that each network subscriber knows the identity and the services provided by each other network subscriber.

According to a preferred embodiment, during the first phase, each of the network subscribers respectively transmits an identification message to the other network subscribers at a predefined time interval, in particular in the form of a broadcast in each case. Upon receiving this identification message, the other network subscribers respectively preferably carry out an authentication of the corresponding network subscriber which transmitted the identification message. In particular, during the first phase, all network subscribers thus carry out a mutual authentication cyclically at predefined time intervals, in an automated manner. Thus, in particular network subscribers which are newly added to the network may be automatically identified, advantageously without a configuration or identification process being explicitly carried out when the new network subscriber is added.

Preferably, in the second phase, the first network subscriber transmits a request for a secure, encrypted communication channel in the form of a communication request to the second network subscriber. Advantageously, in the second phase, if the second network subscriber allows communication with the first network subscriber, said second network subscriber establishes an encrypted communication channel to the first network subscriber. For example, for this purpose, a Diffie-Hellman key exchange may take place. The further communication between the first and the second network subscriber subsequently takes place via this encrypted communication channel.

Advantageously, in the second phase, the second network subscriber requests information about the first network subscriber, in order to check the trustworthiness of the first network subscriber. After receiving this information, the second network subscriber preferably determines, based on this information, whether or not the first network subscriber is trustworthy. For example, an attestation of the trustworthiness of the first network subscriber (for example, in the form of a certificate) may be requested as this kind of information, by an instance which is classified by the second network subscriber as being trustworthy. For example, the check of the trustworthiness of the first network subscriber may take place by means of a public key infrastructure (PKI).

According to a preferred embodiment, in the second phase, the second network subscriber creates access data if it allows access by the first network subscriber. The second network subscriber stores these access data internally, advantageously in a secure memory area. Advantageously, it transmits the access data to the first network subscriber, advantageously via the encrypted communication channel. For example, a user password combination may be created as such access data. These access data are used for access by the first network subscriber to the second network subscriber.

The disclosure is suitable for various types of networks. Particularly advantageously, the method is suitable for machines made up of a plurality of machine components which are interconnected as a network subscriber via a corresponding network.

Such a machine may in particular be configured as a machine tool, for example, a welding system, a screw system, a wire saw or a milling machine, or as a web handling machine, for example, a printing machine, a newspaper printing press, an intaglio printing machine, a screen printing machine, an inline flexographic printing machine, or a packaging machine. The machine may be configured as a (conveyor) system for manufacturing an automobile or for manufacturing components of an automobile (for example, internal combustion engines or control units). In particular, a workpiece is manufactured or processed by means of the machine.

For example, the machine comprises manipulators, motors, sensors, actuators, and/or control units as machine components. Control units, may, for example, be configured as computerized numerical control (CNC), numerical control (NC), programmable logic control (PLC), and/or motion control (MC).

Network subscribers to the network may thus in particular be configured as manipulators, motors, sensors, actuators, and/or control units. In particular, a conventional PC and/or a smart device, in particular a portable handheld device, advantageously, a touchscreen handheld device, for example, a smartphone or a tablet PC, may also be used as network subscribers. For example, status information about the control units which are available in the network may be retrieved, or maintenance may be carried out, by means of such a smart device. In particular, a software application (a so-called app), which in particular constitutes a human-machine interface, may be executed on the smart device.

A computing unit according to the disclosure, for example, a control unit of a machine, is configured, in particular in terms of programming, to carry out a method according to the disclosure.

The implementation of the method in the form of a computer program is also advantageous, since this entails particularly low cost, in particular if an executing control unit is being used for other tasks and is therefore available in any case. Suitable data carriers for providing the computer program include in particular magnetic, optical, and electric memories, for example, hard drives, flash memories, EEPROMs, DVDs, etc. A download of a program via computer networks (Internet, intranet, etc.) is also possible.

Additional advantages and embodiments of the disclosure result from the description and the attached drawing.

It is understood that the aforementioned features and the features to be explained hereinafter are applicable not only in each specified combination, but also in other combinations or alone, without departing from the scope of the disclosure.

The disclosure is schematically depicted in the drawings based on exemplary embodiments, and is described in greater detail below with reference to the drawings.

DETAILED DESCRIPTION

Figure 1:
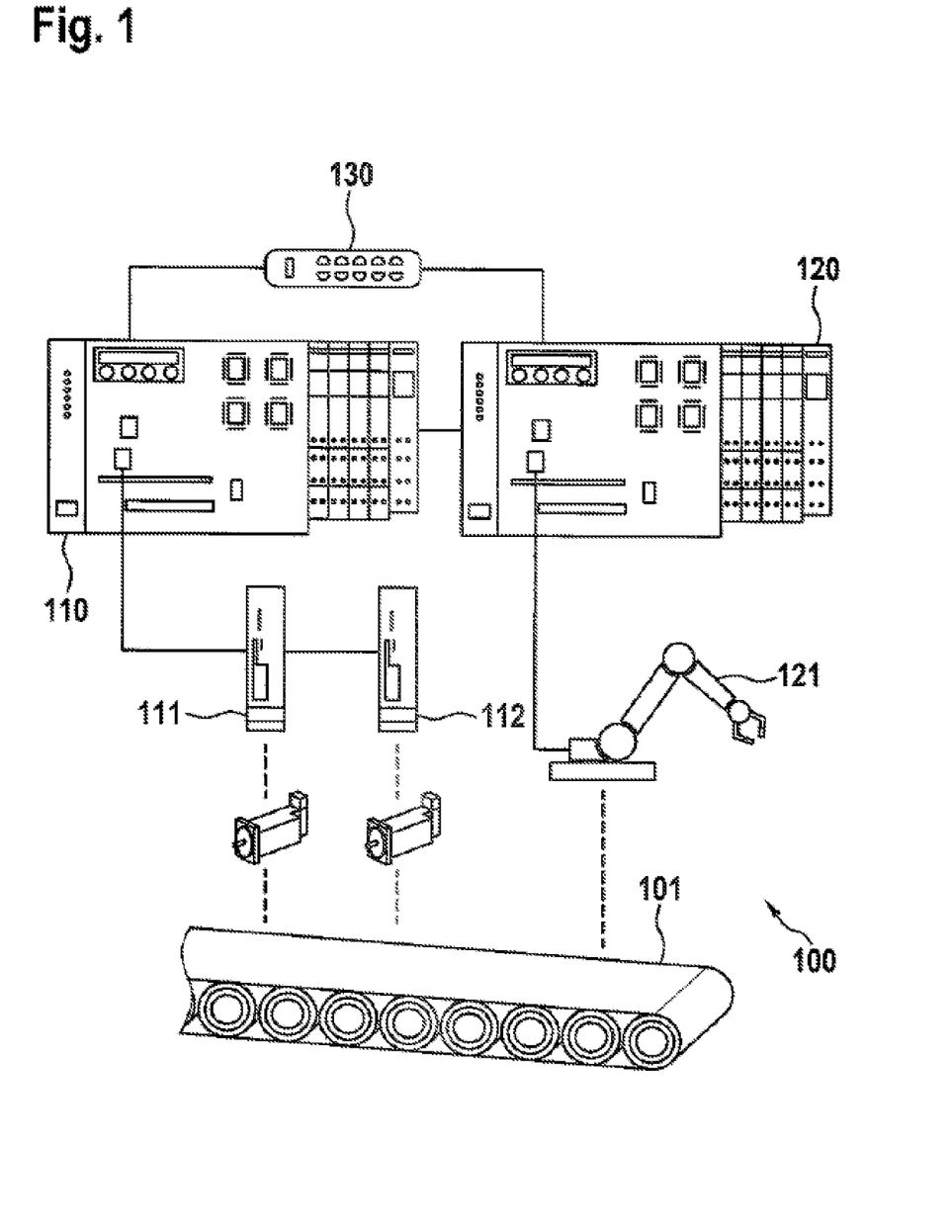
FIGS. 1 and 2 respectively schematically depict a network comprising a plurality of network subscribers which are respectively configured to carry out a preferred embodiment of a method according to the disclosure.

FIG. 1 schematically depicts a network 100 comprising a plurality of network subscribers. A first controller 110 and a second controller 120, which, for example, are respectively configured as a programmable logic controller (PLC), are interconnected as network subscribers via a network switch 130, for example, an Ethernet switch.

The controllers 110, 120 are machine components of a machine which, for example, is configured as a web handling machine. In the depicted example, the machine comprises additional machine components in the form of a conveyor belt 101, drives 111, 112, for example, configured as servo motors, and a robot arm 121.

The drives 111, 112 are connected to the controller 110 and are controlled by it, and are configured to set the conveyor belt 101 in motion. The robot arm 121 is connected to the second controller 120 and is controlled by it.

By means of the machine, workpieces may be manufactured during a production process. During this production process, for example, workpieces may be transported via the variable-speed conveyor belt 101. By means of the robot arm 121, these workpieces may be removed from the conveyor belt and transported further.

For this purpose, the conveyor belt 101 is controlled by the first controller 110, or rather, by the drives 111, 112. In parallel thereto, the robot arm 121 removes the goods and transports them further. The robot arm 121 is appropriately oriented as a function of the instantaneous speed of the conveyor belt 101. To achieve the precision required therefor, both controllers 110, 120 are advantageously synchronized with one another.

In order to enable communication between these individual controllers 110, 120 which is secure, i.e., protected from tampering or eavesdropping, they must be configured accordingly. For this purpose, the controllers 110, 120 are respectively configured to carry out a preferred embodiment of a method according to the disclosure, which will be described below with reference to FIGS. 3 and 4.

For the sake of clarity, in the example of FIG. 1, only two synchronized controllers 110, 120 are depicted. It is understood that that the machine may comprise additional machine components, in particular additional controllers. For example, the machine may comprise additional machine components in the form of welding arms, assembly tools for screws and nuts, milling machines, etc., by means of which the workpieces transported on the conveyor belt 101 are processed during the production process. These machine components may respectively be controlled by an associated controller. For orienting these machine components as a function of the conveyor belt speed, the individual controllers are interconnected via the network 100, synchronized with one another, and correspondingly configured. For this purpose, each of the controllers is configured to carry out a preferred embodiment of a method according to the disclosure.

Using conventional methods, the manual configuration effort increases as the number of controllers increases. By means of the disclosure, this effort may be significantly reduced, and the synchronization of the individual controllers may be carried out in an automated manner.

Figure 2:
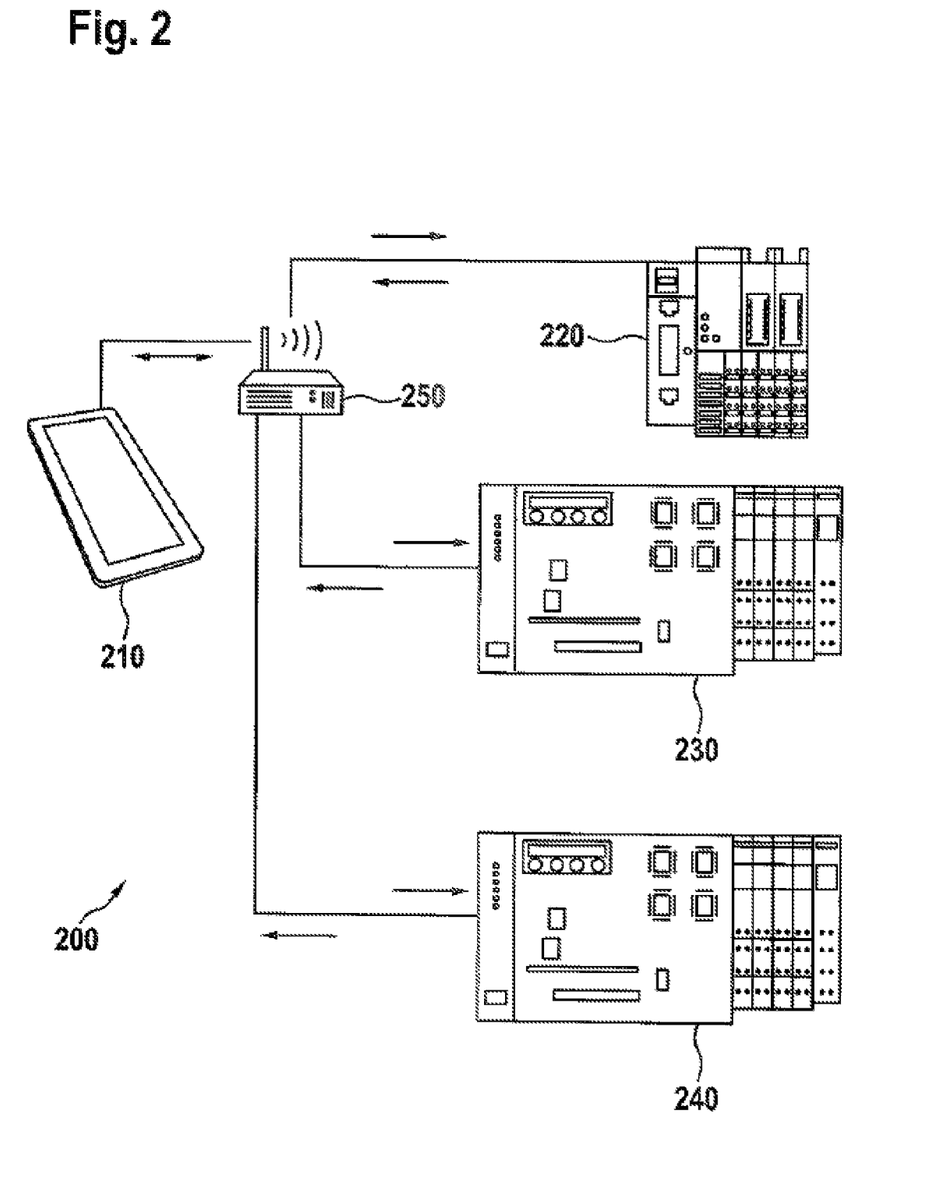

FIG. 2 also schematically depicts a network 200 comprising a plurality of network subscribers. Here, a smart device 210, for example, a tablet PC, as well as controllers 220, 230, 240, which are respectively configured, for example, as PLCs, are interconnected as network subscribers via a network switch 250, for example, an Ethernet switch. The controllers 220, 230, 240 are machine components of a machine, analogously to the example of FIG. 1. For example, each of the controllers 220, 230, 240 may respectively be configured to control a machine component such as a robot arm, a welding arm, an assembly tool for screws and nuts, etc., in order to process a workpiece transported on a conveyor belt.

In the example of FIG. 2, the table PC 210 has recently been added to the network 200, for example, to retrieve status information about the controllers 220, 230, 240 which is available in the network 200, or to perform maintenance. For this purpose, the tablet PC 210 and the controllers 220, 230, 240 are respectively configured to carry out a preferred embodiment of a method according to the disclosure, which will be described below with respect to FIGS. 3 and 4.

It should be noted that in FIGS. 1 and 2, purely by way of example, controllers, or rather, smart devices, are interconnected as network subscribers. The disclosure is equally suitable, for example, for connecting sensors and actuators, or controllers, sensors, and/or actuators, etc.

Figure 3:
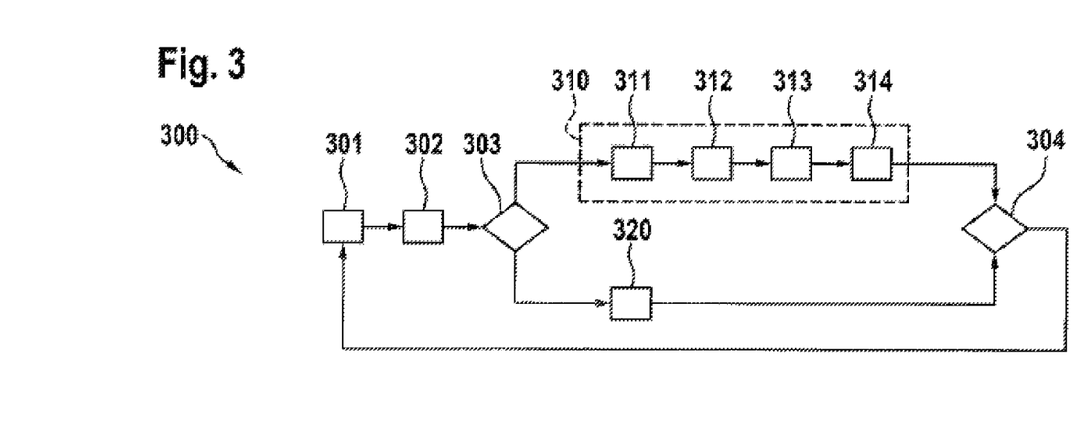
FIGS. 3 and 4 respectively schematically depict a preferred embodiment of a method according to the disclosure as a block diagram.
Figure 4:
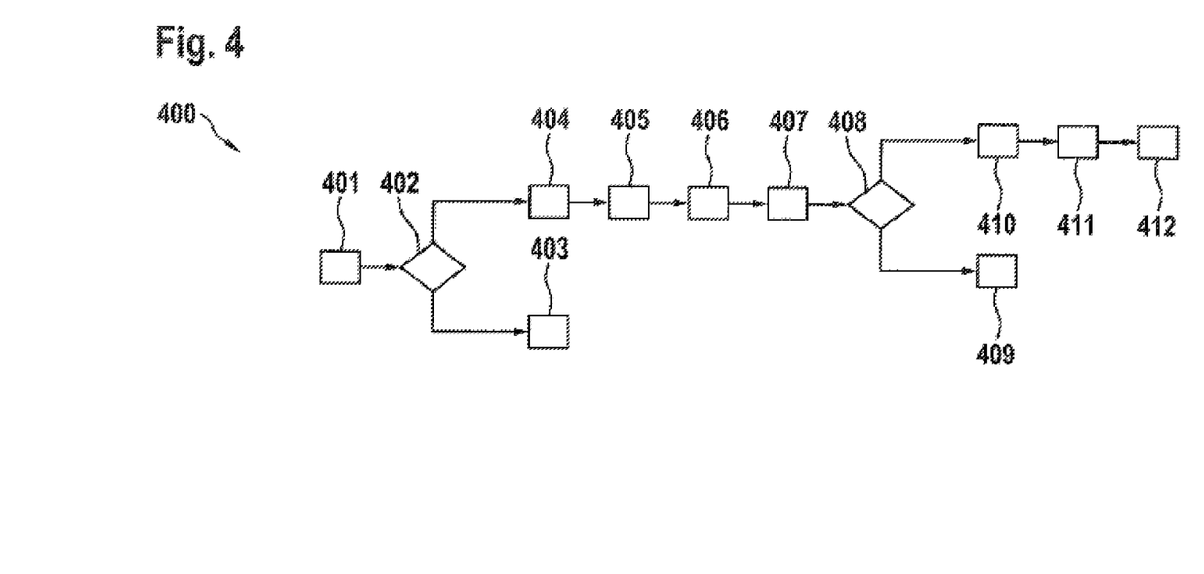

FIGS. 3 and 4 respectively schematically depict a preferred embodiment of a method according to the disclosure as a block diagram. FIG. 3 schematically depicts a first phase of the method as a block diagram, and FIG. 4 schematically depicts a second phase of the method.

An example will be considered below in which the tablet PC 210 from FIG. 2 has been recently added to the network 200 as a first network subscriber, and subsequently would like to access a service of the controller 220 as a second network subscriber.

After the tablet PC 210 has been added to the network 200 and connected to the network 200, for example, via a wireless communication link such as WLAN or Bluetooth, a first phase 300 (device detection phase, authentication phase) is carried out according to a preferred embodiment of the method according to the disclosure, as is schematically depicted in FIG. 3 and explained below based on this figure.

In a step 301, the tablet PC 210 transmits an identification message to all network subscribers 220, 230, 240 in the network 200. In particular, the tablet PC 210 transmits a telegram as an identification message, comprising an identifier which describes its own unique identity, via a broadcast to the network subscribers 220, 230, 240.

After receiving the identification message, the following steps 302 to 309 are respectively carried out in a similar manner by all network subscribers 220, 230, 240. For the sake of simplicity, steps 302 to 309 are described by way of example only for the controller 220 as the second network subscriber.

In step 302, the controller 220 receives the identification message, and in step 303, checks whether it has already carried out an authentication of the tablet PC 210, i.e., whether the tablet PC 210 is already known to it. For this purpose, in step 303, the controller 220 checks whether an entry, which describes the identity of the tablet PC 210, is stored in a database which is stored in a memory of the controller 220.

Since the tablet PC 210 has recently been added to the network 200, it is not known to the controller. Therefore, the controller 220 carries out an authentication 310 of the tablet PC 210. For this purpose, in step 311, the controller 220 requests a certificate of the tablet PC 210. In step 312, this certificate is sent and received by the controller 220. In step 313, the controller 220 carries out the authentication of the tablet 210 as a function of the certificate, in particular based on the information stored in the certificate. After a successful authentication, in step 314, the controller 220 creates a corresponding entry for the tablet PC 210 in the database, wherein the identity of the tablet PC 210 and the telegram received in step 302 and the certificate received in step 312 are stored in the database as such an entry.

Furthermore, in step 314, the entry is provided with a time stamp, since the entry is valid only until the expiration of a validity interval, and is again removed from the database after the expiration of this validity interval. The entry in the database is therefore updated at certain time intervals.

For this purpose, in step 304, the tablet PC 210 checks whether a predefined time interval has elapsed since the transmission of the identification message in step 301, wherein this predefined time interval is advantageously shorter than the validity interval. After this predefined time interval, the table PC 210 again transmits the corresponding telegram as an identification message, via a broadcast to the network subscribers 220, 230, 240.

After a renewed reception of the identification message in step 302, in step 303, the controllers 220, 230, 240 respectively check again whether an entry for the tablet PC 210 is available in their respective database. If this is already the case, the controllers 220, 230, 240 do not carry out another authentication, but rather, in step 320, update the time stamp of the respective entry and respectively restart the validity interval. Subsequently, in step 304, the tablet PC 210 checks again whether the predefined time interval has elapsed, and after it has elapsed, in step 301, retransmits the identification message.

In a similar manner, each of the other network subscribers 220, 230, 240 respectively also transmits a corresponding identification message at predefined time intervals in the form of a broadcast to the remaining network subscribers, which create entries in their databases in a similar manner. Thus, the network subscribers 210, 220, 230, 240 cyclically mutually authenticate themselves in the first phase 300 at predefined time intervals.

Thus, the network subscribers 210, 220, 230, 240 are respectively mutually identified, but not authorized; i.e., the network subscribers 210, 220, 230, 240 have no rights to access one another. If one of the network subscribers 210, 220, 230, 240 would like to access another one, according to a preferred embodiment of the method according to the disclosure, a second phase 400 (authorization phase, security configuration phase) is carried out, as schematically depicted in FIG. 4 and explained below based on this figure.

As mentioned earlier, an example will be considered below, in which the tablet PC 210, as a first network subscriber, would like to access a service of the controller 220 as a second network subscriber.

In step 401, the tablet PC 210 thus transmits a communication request to the controller 220. In particular, the tablet PC 210 transmits a request for a secure, encrypted communication channel, indicating its own identity.

In step 402, after receiving this communication request, the controller 220 checks whether it has carried out an authentication of the tablet PC 210 during the first phase 300, i.e., whether the tablet PC 210 is known to it. For this purpose, in step 402, the controller 220 checks whether an entry for the tablet PC 210 is present in its database, and whether this entry is still valid. If this is not the case, the controller 220 rejects the communication request and does not allow any communication with the tablet PC 210.

If the corresponding entry in the database is present and valid, in step 404, the controller 220 allows the communication with the tablet PC 210 and establishes a secure communication channel with the tablet PC 210, for example, by means of a Diffie-Hellman key exchange.

In step 405, the tablet PC 210 transmits an access request to the controller 220 via this secure communication channel. By means of this access request, the tablet PC 210 informs the controller 220 about the service provided by the controller 220 which it would like to access.

For example, as a service, the tablet PC 210 may access the transmission of sensor data which the controller 220 detects from sensors of the corresponding machine, which are connected to said controller. By means of this sensor data, the tablet PC 210 may, for example, display status information about the machine to a user.

After receiving the access request, the controller 220 checks a level of trustworthiness of the tablet PC 210. This check of the trustworthiness may, for example, take place by means of a public key infrastructure (PKI). For this purpose, in step 406, the controller 220 requests information about the tablet PC 210, for example, an attestation of the trustworthiness of the tablet PC 210 in the form of a certificate from an instance which is classified as trustworthy. In step 407, this information is transmitted from the corresponding instance to the controller 220 and received by said controller.

After receiving this information, in step 408, the controller determines whether or not the tablet PC 210 is trustworthy, based on this information. If the tablet PC 210 is not classified as trustworthy, in step 409, the controller 220 rejects the access request and does not allow the request access.

However, if the controller 220 classifies the tablet PC 210 as trustworthy, it allows the access. In this case, in step 410, the controller creates access data, for example, a user-password combination, and stores this access data internally. In step 411, the controller 220 transmits the access data to the tablet PC 210 via the encrypted communication channel. In step 412, the tablet PC 210 accesses the corresponding service of the controller 220 by means of this access data.

What is claimed is:

1. A method for enabling access by a first network subscriber to a second network subscriber in a network, the method comprising:
   transmitting an identification message from the first network subscriber to the second network subscriber;
   receiving a communication request from the first network subscriber with the second network subscriber;
   after receiving the communication request, determining whether the second network subscriber has carried out an authentication of the first network subscriber during a first phase;
   allowing communication with the first network subscriber if the second network subscriber has carried out the authentication;
   receiving an access request from the first network subscriber with the second network subscriber;
   after receiving the access request, determining a level of trustworthiness of the first network subscriber; and
   enabling access or rejecting access of the first network subscriber based on determined level of trustworthiness,
   wherein the identification message includes identification of the first network subscriber and information regarding which services the first network subscriber provides.

2. The method according to claim 1, further comprising: authenticating the first network subscriber using the second network subscriber as a function of the identification message, after receiving the identification message from the first network subscriber in the first phase.

3. The method according to claim 2, wherein the authentication of the first network subscriber is valid until expiration of a predefined validity interval.

4. The method according to claim 3, further comprising:
creating an entry for the first network subscriber in a database in the first phase, during the authentication, using the second network subscriber.

5. The method according to claim 4, further comprising:
removing the entry from the database after an expiration of the predefined validity interval.

6. The method according to claim 2, further comprising:
requesting, using the second network subscriber, a certificate of the first network subscriber in the first phase, during the authentication in the first phase.

7. The method according to claim 1, further comprising:
establishing an encrypted communication channel to the first network subscriber, using the second network subscriber, when the second network subscriber allows communication with the first network subscriber.

8. The method according to claim 1, further comprising:
requesting information, using the second network subscriber, about the first network subscriber in order to determine the level of trustworthiness of the first network subscriber; and
determining whether or not the first network subscriber is trustworthy based on the requested information.

9. The method according to claim 1, further comprising:
creating access data, using the second network subscriber, when the second network subscriber enables access of the first network subscriber; and
transmitting the access data to the first network subscriber.

10. A method for requesting access by a first network subscriber to a second network subscriber in a network, comprising:
transmitting an identification message to the second network subscriber in a first phase, using the first network subscriber;
transmitting, using the first network subscriber, a communication request to the second network subscriber;
transmitting, using the first network subscriber, an access request to the second network subscriber;
accessing the second network subscriber using the first network subscriber;
requesting information, using the second network subscriber, about the first network subscriber in order to determine the level of trustworthiness of the first network subscriber;
determining whether or not the first network subscriber is trustworthy based on the requested information; and
transmitting, using the first network subscriber, the identification message to the second network subscriber at predefined intervals in the first phase,
wherein the identification message includes identification of the first network subscriber and information regarding which services the first network subscriber provides.

11. A method for enabling and requesting access by a first network subscriber to a second network subscriber in a network, comprising:
transmitting, using the first network subscriber, a first identification message to the second network subscriber;
transmitting, using the first network subscriber, a communication request to the second network subscriber;
receiving the communication request from the first network subscriber with the second network subscriber;
after receiving the communication request, determining with the second network subscriber whether the second network subscriber has carried out an authentication of the first network subscriber during a first phase;
allowing communication with the first network subscriber if the second network subscriber has carried out the authentication;
transmitting, using the first network subscriber, an access request to the second network subscriber;
receiving an access request from the first network subscriber with the second network subscriber;
after receiving the access request, determining a level of trustworthiness of the first network subscriber with the second network subscriber;
enabling access or rejecting access, with the second network subscriber, of the first network subscriber based on determined level of trustworthiness; and
accessing the second network subscriber using the first network subscriber,
wherein the first identification message includes identification of the first network subscriber and information regarding which services the first network subscriber provides.

12. The method according to claim 11, further comprising:
transmitting an identification message, using each respective network subscriber of the plurality of network subscribers of the network, to other network subscribers; and
authenticating the corresponding network subscriber that transmitted the corresponding identification message, upon receiving the identification message,
wherein the first network subscriber and the second network subscriber are included in the plurality of network subscribers.

13. The method according to claim 12, further comprising:
transmitting the identification message to the other network subscribers at predefined intervals in the first phase, using each network subscriber of the plurality of network subscribers.

14. The method according to claim 10, further comprising:
transmitting, using the first network subscriber, the access request to the second network subscriber when the second network subscriber allows communication with the first network subscriber in response to the communication request.

15. The method according to claim 10, further comprising:
accessing the second network subscriber, using the first network subscriber, when the second network subscriber enables access of the first network subscriber in response to the access request.

* * * * *